US009028576B2

(12) United States Patent
Slayter et al.

(10) Patent No.: US 9,028,576 B2
(45) Date of Patent: May 12, 2015

(54) GEARBOX DEOILER WITH PRE-PRESSURING COMPONENT

(75) Inventors: Matthew Slayter, Rockford, IL (US); Michael R. Blewett, Stillman Valley, IL (US); Adrian L. Stoicescu, Roscoe, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 643 days.

(21) Appl. No.: 13/292,593

(22) Filed: Nov. 9, 2011

(65) Prior Publication Data

US 2013/0112029 A1    May 9, 2013

(51) Int. Cl.
*B01D 46/18* (2006.01)
*F02C 7/32* (2006.01)
*F01D 25/18* (2006.01)
*F02C 6/00* (2006.01)

(52) U.S. Cl.
CPC ............. *F02C 7/32* (2013.01); *Y10T 74/19991* (2015.01); *F05D 2260/609* (2013.01); *F01D 25/18* (2013.01); *F02C 6/00* (2013.01)

(58) Field of Classification Search
CPC ............. F02C 7/32; F02C 6/00; F01D 25/18; Y10T 74/19991; F05D 2260/609
USPC ............. 55/400, 406, 408, 409, 418
See application file for complete search history.

(56) References Cited

U.S. PATENT DOCUMENTS 6,033,450 A *  3/2000  Krul et al. .................. 55/345
7,063,510 B2   6/2006  Takeshita et al.
7,377,110 B2   5/2008  Sheridan et al.

FOREIGN PATENT DOCUMENTS

| CN | 201228763 Y | 4/2009 |
| CN | 201844181 U | 5/2011 |
| JP | 2000179659 A | 6/2000 |
| JP | 2001115973 A | 4/2001 |
| JP | 2001263463 A | 9/2001 |
| JP | 2010059825 A | 3/2010 |

OTHER PUBLICATIONS

CN Office Action for Application No. 201210558531.3, Issued Dec. 24, 2014, 10 pages.

* cited by examiner

*Primary Examiner* — Dung H Bui
(74) *Attorney, Agent, or Firm* — Cantor Colburn LLP

(57) ABSTRACT

A gearbox includes an inlet configured to receive a mixture of air and oil from an external source and a deoiler. The deoiler includes a shaft including an inlet passage and an outlet passage, both formed on an inner portion of the shaft and separated from one another, a separator unit coupled to and surrounding a portion of the shaft and including an inlet and an outlet and a pre-pressuring component coupled to the shaft that increases the pressure of the mixture of oil and air to form a pressurized mixture and provides the pressurized mixture to the inlet of the separator unit.

15 Claims, 3 Drawing Sheets

GEARBOX DEOILER WITH PRE-PRESSURING COMPONENT

BACKGROUND OF THE INVENTION

The present invention relates to gearboxes, and, in particular, to a deoiler portion of a gearbox.

A typical gas turbine engine for an aircraft is coupled to a shaft that drives other shafts via a connection to a gearbox. As the air flows through the gearbox housing, a certain amount of oil naturally becomes entrained in the air. For instance, bearing compartments in the turbine can be vented into the gearbox and increase the amount of oil in the air in the gearbox. For a number of reasons, it is desirable that this oil be separated from the air before the air is vented from the gearbox.

In order to separate the oil from the air, a deoiler is included in the gearbox. In general, the deoiler includes a separator unit that utilizes centrifugal forces to separate the heavier oil from the lighter air. In some cases, the deoiler includes a shaft to which the separator unit is attached and that includes an outlet through which clean air can be exhausted to the environment.

When the engine is driving components in the gearbox (e.g., the deoiler), pressures greater than atmospheric build up within the gearbox and, due to the high speed rotating gears within the gearbox, oil from the gearbox itself can become entrained in the air in chamber. As mentioned above, oil can also be introduced from the bearing compartments due to air that leaks into the bearing compartments from the higher-pressure sections of the engine (e.g., compressors and turbines). It is often desirable to minimize the pressure in the gearbox and bearing compartments to help balance the pressure forces on the seals to avoid blowing engine lubricating oil out of the bearing compartments into the lower pressure sections of the compressor, or turbine. For this reason a low pressure drop across the deoiler in general and the separating unit in particular is usually desired as this pressure drop biases the bearing compartment and gearbox pressure upward. That is, if there is a large pressure drop across the separating unit, the pressure in the gearbox must be increased to drive air into it. It is also advantageous to minimize the size (envelope) and weight of the separating unit. However, to achieve the desired pressure drop performance, the size is often increased beyond the size needed to obtain the desired air-oil separation.

BRIEF DESCRIPTION OF THE INVENTION

According to one embodiment, a gearbox that includes an inlet configured to receive a mixture of air and oil from an external source and a deoiler is disclosed. The deoiler in this embodiment includes a shaft including an inlet passage and an outlet passage, both formed on an inner portion of the shaft and separated from one another, a separator unit coupled to and surrounding a portion of the shaft and including an inlet and an outlet and a pre-pressuring component coupled to the shaft that increases the pressure of the mixture of oil and air to form a pressurized mixture and provides the pressurized mixture to the inlet of the separator unit.

According to another embodiment, a method for removing oil from a mixture of air and oil is disclosed. The method includes: passing the mixture through a pre-pressuring component to raise the pressure of the mixture of air and oil from a first pressure level to a second pressure level higher than the first level; and providing the mixture of air and oil at the second pressure level to a rotating separator unit coupled to a shaft to remove some or all of the oil from the mixture to create exhaust air.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
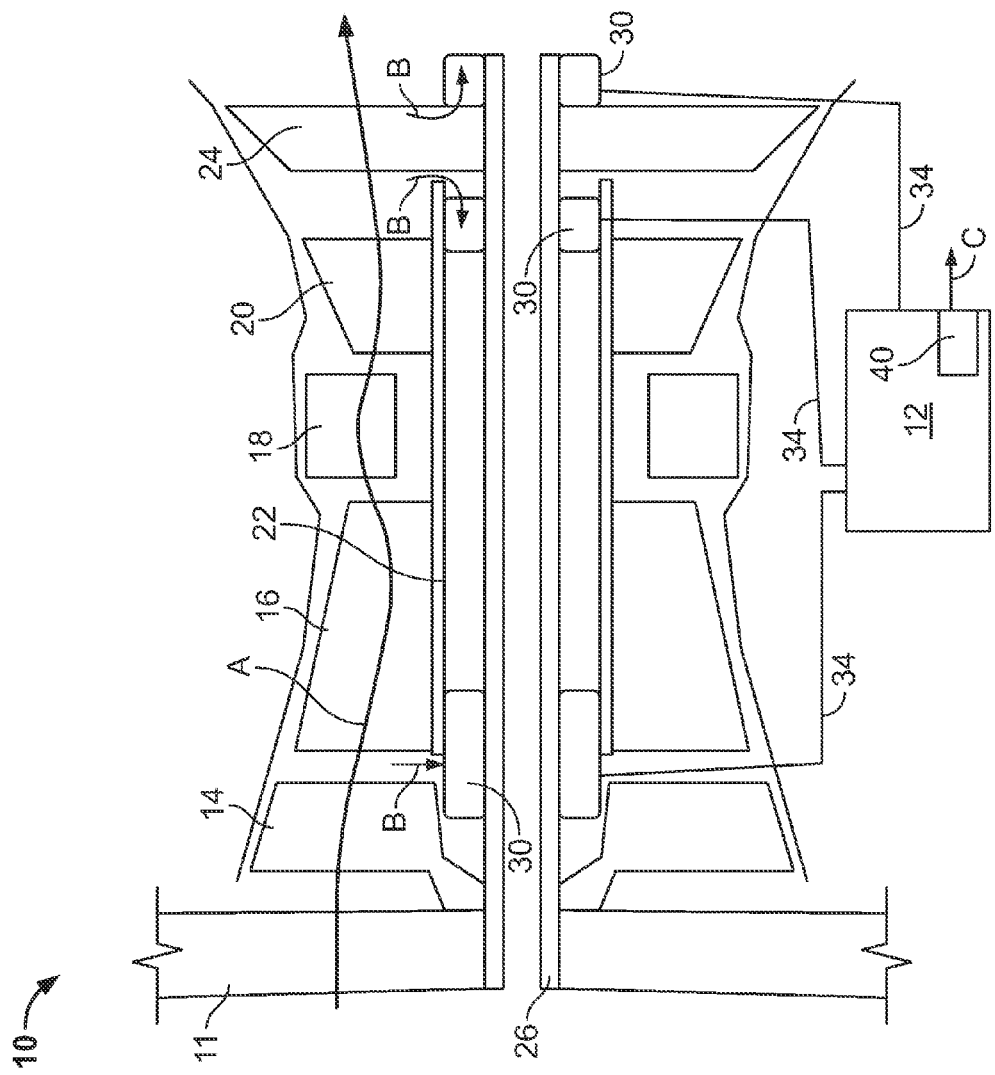
FIG. 1 is a cut-away side view of an engine coupled to a gear box.

Referring now to FIG. 1, a simplified turbine 10 is illustrated coupled to a gear box 12. The turbine 10 causes air to generally travel in the direction shown by arrow A to generate thrust. In more detail, the turbine 10 includes a fan 11 that draws air into the turbine 10. The air is then compressed, in series, by low 14 and high pressure 16 compressors. The compressed air is then mixed with fuel and burned in a combustor 18 to create a hot-gas flow that expands in a high pressure turbine 20 and causes the spool 22 to rotate. The spool 22 provides rotational force to the high pressure compressor 16. The hot-gas flow also drives a low pressure turbine 24 in order to rotate a central shaft 26 and provide rotation energy to, for example, the fan 11 and the low pressure compressor 14. It shall be understood that the turbine 10 illustrated in FIG. 1 is presented by way of example and the teachings herein can be applied to a gearbox attached to any type of engine or to any other source of rotational energy.

The central shaft 26 and/or the spool 22 can be coupled to one or more bearing compartments 30 as is known in the art. Pressurized air (indicated by arrows B) from the turbine 10 can enter the bearing compartments 30 and cause oil contained therein to be expelled into the gearbox 12. To that end, one or more air/fluid passages 34 can couple the bearing compartments 30 to the gearbox 12. It shall be understood by the skilled artisan that the gearbox 12 could also include a shaft (not shown) linked to the spool 22 or the central shaft 26 that provides rotational energy to the gearbox 12. This rotational energy can be used, for example, to drive a deoiler 40 included in the gearbox 12. In general, the deoiler 40 causes oil entrained in air in the gearbox 12 to be removed from the air as it is expelled from the gearbox 12 as indicated by arrow C.

Figure 2:
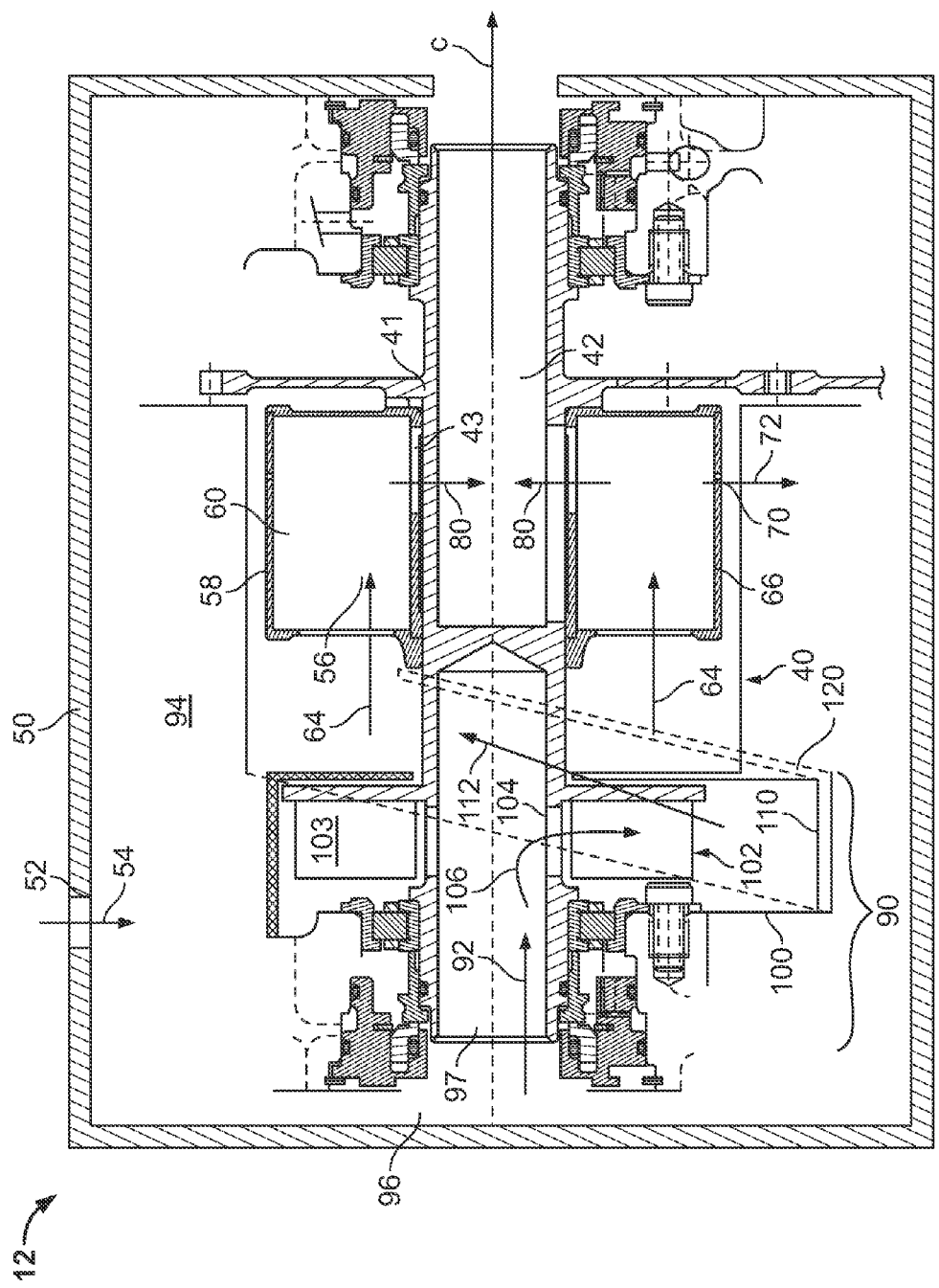
FIG. 2 is a partial cross sectional top-view of a gearbox.

FIG. 2 is a partial cross sectional top-view of a gearbox 12 according to one embodiment. In this embodiment, the gearbox 12 includes a shell 50 that forms the outer boundaries of the gearbox 12. The shell 50 includes an inlet 52 through which an air-oil mixture 54 can enter. The air-oil mixture 54 can be received, for example, from the bearing compartments 30 via air/fluid passages 34 as shown in FIG. 1. Of course, the air-oil mixture 54 could be received from any location and is not limited to being initiated in the bearing compartments 30. Indeed, in one embodiment, a mixture of air and oil can be created simply with oil found in the gearbox 12. It shall be understood that while mixture 54 is referred to as an air-oil mixture, it could be a mixture of air and any type of fluid. In one embodiment, the inlet 52 receives mixture 54 directly from an external pipe directly coupled to the bearing compartment 30.

As previously described, the gearbox 12 can include a deoiler 40 that removes some or all of the oil from the air-oil mixture 54 and expels clean air as indicated by arrow C which may be exhausted to atmosphere. While not illustrated, it shall be understood that the gearbox 12 is linked to the turbine 10 and receives rotational energy from it. The rotational energy can be used to drive the deoiler 40. In more detail, the deoiler 40 includes a shaft 41 that is driven by the rotational energy. The shaft 41 includes an outlet passage 42 formed on an interior portion thereof through which clean air (arrow C) is exhausted. A separator unit 58 is coupled to the shaft 41 and provides a path from a location within the gearbox 12 to the outlet passage 42. The separator unit 58 can include a separator media 60 disposed therein such as a metal or other foam.

In operation, the air-oil mixture 54 and any other air/fluid mixture within the shell 50 of the gearbox 12 is drawn into the inlets ports 56 of the separator unit 58 of the deoiler 40. The air so drawn shall be referred to herein as inlet flow 64. The separator media 60 provides surfaces for oil particles in the inlet flow 64 to adhere to. The droplets of oil coalesce and the liquid is centrifugally slung to the outer diameter 66 of the separator unit 58 where it passes through drain holes 70 back into the gearbox 12 as is indicated by arrows 72. Air passes from an outside portion of the shaft 41 to the outlet passage 42 through one or more inner passages 43 surrounded by at least a portion of the separator unit 58.

The pressure drop from the inside of the gearbox 12 to the outlet passage 42 depends upon the flow geometry and the rotational speed of the separator unit 58. In particular, the geometry factors that influence pressure drop are ones that minimize the flow velocity (large flow area) and that allow gradual changes in flow direction and flow passage area. This avoids turbulence in the flow passages. To reduce the geometry related pressure drop usually means the separator unit 58 is made larger and heavier. The speed related pressure drop depends upon two things: the centrifugal pressure drop required to move air radially inward to the outlet passage 42 (arrows 80) in opposition to the centrifugal acceleration experienced by the oil. The second part of the pressure drop depends upon the flow loss associated with accelerating the inlet flow 64 up to the rotational speed of the separator unit 58. Tests have shown that this second part of the pressure drop (e.g., flow loss) is usually larger than the centrifugal pressure drop. As such, according to one embodiment, it may be advantageous to minimize the over-all system pressure drop by matching the rotational speed of the inlet flow 64 to the rotational speed of the separator unit 58. By "synchronizing" these speeds, the pressure drop across the separator unit 58 can be reduced.

For example, consider three cases. In the first case, the separator unit 58 is stationary. In such a case, little to no acceleration (i.e., pressure) is required for the inlet flow 64 to enter the separator unit 58. In the second case, the separator unit 58 is rotating and the inlet flow 64 is rotationally stationary. In such a case, the inlet flow 64 must accelerate to match the rotational speed of the separator unit 58. The energy for this acceleration comes from the pressure in the inlet flow and so the pressure of the flow inside the separator unit 58 falls a bit. This increases the pressure drop across the separator unit 58. Such a pressure drop is typically overcome by increasing the size of the separator unit 58. In the third case, assume that the inlet flow 64 is rotating about the shaft 41 at or about the same speed as the separator unit 58 is rotating. In this case, no additional energy (e.g., pressure) is required.

According to one embodiment, the pressure of the inlet flow 64 can be matched to that required so that it can pass through the separator unit 58 by a pre-pressurizing component 90. In general, the pre-pressuring component 90 draws an air-oil mixture 92 that exists in an internal portion 94 of the gearbox 12 and increases the pressure thereof such that its output (inlet flow 64) is at or near the pressure required to force the inlet flow 64 through the separator unit 58 in the manner described above. This increase in pressure allows for the situation described above in the second case to be overcome without increasing the size of the separator unit 58 or increasing pressure in the internal portion.

In addition, in one embodiment, the pre-pressuring component 90 imparts rotational motion to the inlet flow 64 to make it match or become closer to matching the rotational speed of the separator unit 58. That is, the pre-pressuring component 90 can be utilized to approximate the third case described above.

In one embodiment, the pre-pressuring component 90 is coupled to the shaft 41. In such an embodiment, the shaft 41 includes a shaft inlet 96 through which an air-oil mixture 92 can enter an inlet passage 97 formed within the shaft 41. The shaft inlet 96 is separated from and not in fluid communication the outlet passage 42. In one embodiment, the shaft inlet 96 is disposed at one end of the shaft 41 and the outlet passage 42 is disposed at the opposite end of the shaft 41.

The pre-pressuring component 90 includes an outer housing 100. The outer housing 100 can have, in one embodiment and as illustrated in FIG. 2, a cross section that forms a volute or scroll. Of course, depending on the requirements of the system, the outer housing 100 could take on other cross-sectional shapes. For instance, in one embodiment, the outer housing 100 could have a substantially circular cross-section.

The outer housing 100 surrounds a blade assembly 102 that rotates within it and is coupled to the shaft 41. As shown in more detail below, the blade assembly 102 includes one or more blades 103. In one embodiment, the blade assembly 102 includes inlets 104 that allow the air-oil mixture 92 to be drawn from the inlet passage 97 into the outer housing 100 due to rotation of the blade assembly 102 as indicated by arrow 106. In more detail, as the blade assembly 102 rotates, the blades 103 interact with the air-oil mixture 92. This interaction causes the air-oil mixture 92 to be accelerated towards an outer perimeter 110 of the outer housing 100. This acceleration causes the pressure of the air-oil mixture 92 to increase. In FIG. 2, the air-oil mixture with increased pressure is indicated by arrow 112. In one embodiment, the pressure of the air-oil mixture 112 is at or near the pressure drop through the separator unit 58.

As illustrated in dashed lines in FIG. 2, the outer housing 100 can also include a connection passage 120 that provides air-oil mixture 112 to inlet ports 56 such that it becomes inlet flow 64. In this manner, inlet flow 64 can be at a pressure that allows it to pass through the separator unit 58 without having to increase the pressure in the internal portion 94. In one embodiment, the direction of arrow 112 in the same or similar direction to the direction of rotation of the separator unit 58. As such, the amount of pressure that needs to be added to the air-oil mixture 92 to form air-oil mixture 112 can be minimized.

Figure 3A:
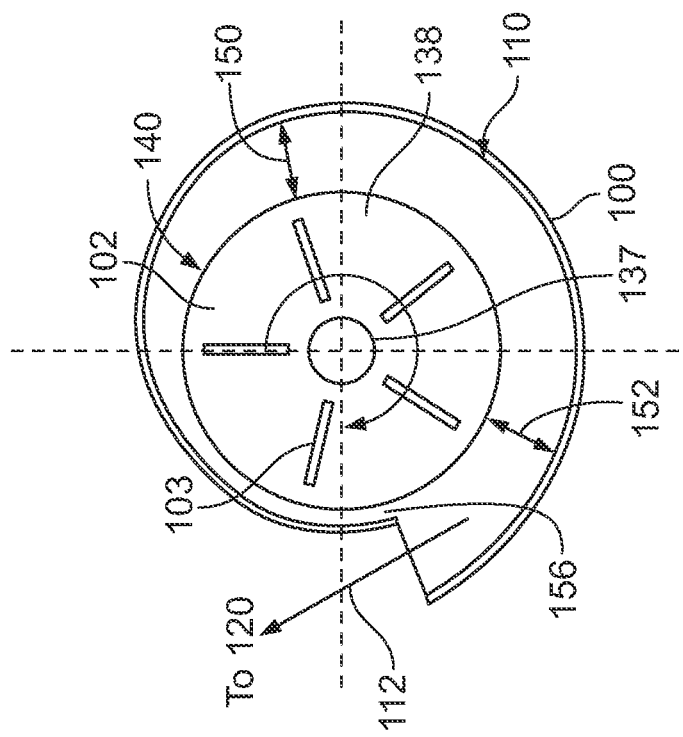
FIGS. 3A and 3B are cross-sections of a blade assembly surrounded by an outer housing according to two embodiments.
Figure 3B:
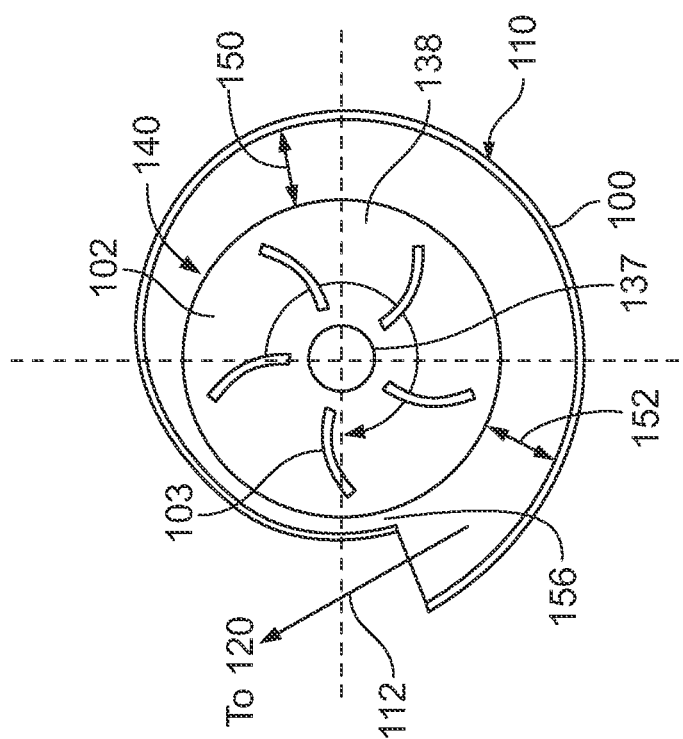

FIGS. 3A and 3B illustrate two different embodiments of a cross-section of the outer housing 100 and blade assembly 102 shown in FIG. 2. In FIGS. 3A and 3B, the blade assembly 102 rotates in a clockwise direction as indicated by arrow 138. In both cases, the blade assembly 102 includes a plurality of radially extending blades 103. The blades 103 can take on different shapes. For instance, in FIG. 3A the blades 103 are curved and in FIG. 3B they are straight. In one embodiment, the blades 103 are supported on a base 138. Of course, the blades could be coupled solely to an internal diameter 137 of the blade assembly 102 in one embodiment.

The air-oil mixture 92, as described above, enters through inlets 104 (FIG. 2) at the internal diameter 137 of the blade assembly 102. The mixture is then flung outwardly due to centrifugal force towards the outer wall 110 of the outer housing 100. In the illustrated embodiment, the distance between the blades 103 or an outer edge of the base 138 and the outer wall 110 increases when measured from a starting location 156 to another location displaced clockwise from the starting location 156. This is illustrated by distances 150 and 152 where distance 152 is greater than and further from location 156 than distance 150. The mixture is pressurized due to interactions with the blades 103 and exits the outer housing 100 and is delivered to the connection passage 120 and, ultimately, to the separator 58 (FIG. 2).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A gearbox comprising:
   an inlet configured to receive a mixture of air and oil from an external source; and
   a deoiler, the deoiler comprising:
   a shaft including an inlet passage and an outlet passage, both formed on an inner portion of the shaft and separated from one another;
   a separator unit coupled to and surrounding a portion of the shaft and including an inlet and an outlet; and
   a pre-pressuring component coupled to the shaft that increases the pressure of the mixture of oil and air to form a pressurized mixture and provides the pressurized mixture to the inlet of the separator unit;
   wherein the shaft inlet passage is upstream of the separator unit.

2. The gearbox of claim 1, wherein the shaft includes one or more inner passages that fluidly connect an external portion of the shaft to the inner portion.

3. The gearbox of claim 2, wherein the separator unit surrounds the one or more inner passages and serves to remove oil from air that enters it before and to direct the air to the one more inner passages.

4. The gearbox of claim 1, wherein the pre-pressuring component is arranged to surround at least a portion of the inlet passage such that it can receive the mixture of oil and air therefrom.

5. The gear box of claim 4, wherein the shaft includes passages that allow the mixture of air and oil to pass from the inner portion to the pre-pressuring component.

6. The gearbox of claim 4, wherein the pre-pressuring component includes an outer housing that surrounds a plurality of blades.

7. The gearbox of claim 6, wherein one or more of the plurality of blades are curved and extend radially outward.

8. The gearbox of claim 6, wherein one or more of the plurality of blades are flat and extend radially outward.

9. The gearbox of claim 6, wherein the outer housing has a spiral shaped outer wall.

10. The gearbox of claim 1, wherein the external source is a bearing compartment of a turbine engine.

11. A method for removing oil from a mixture of air and oil, the method comprising:
    passing the mixture through a first shaft having an inlet and an outlet;
    passing the mixture as it leaves the outlet through a pre-pressuring component to raise the pressure of the mixture of air and oil from a first pressure level to a second pressure level higher than the first level; and
    providing the mixture of air and oil at the second pressure level to a rotating separator unit coupled to a shaft to remove some or all of the oil from the mixture to create exhaust air.

12. The method of claim 11, further comprising:
    passing the exhaust air to an outlet portion of the shaft where it is exhausted to the atmosphere.

13. The method of claim 11, wherein passing the mixture includes:
    receiving the mixture from an inlet portion of the shaft, the inlet portion being internal to the shaft and separated from the outlet portion.

14. The method of claim 13, wherein passing the mixture further includes:
    interacting the mixture with a plurality of blades rotating within an outer housing of the pre-pressuring component.

15. The method of claim 14, wherein the outer housing has a spiral shaped outer wall.

\* \* \* \* \*